US 10,065,353 B2

(12) United States Patent
Schoonover

(10) Patent No.: US 10,065,353 B2
(45) Date of Patent: Sep. 4, 2018

(54) METHOD FOR MAKING MAP POCKET STIFFENERS

(71) Applicant: Vintech Industries, Inc., Imlay City, MI (US)

(72) Inventor: James Schoonover, Shelby Township, MI (US)

(73) Assignee: Vintech Industries, Inc., Imlay City, MI (US)

( * ) Notice: Subject to any disclaimer, the term of this patent is extended or adjusted under 35 U.S.C. 154(b) by 454 days.

(21) Appl. No.: 14/677,565

(22) Filed: Apr. 2, 2015

(65) Prior Publication Data

US 2015/0283748 A1 Oct. 8, 2015

Related U.S. Application Data

(60) Provisional application No. 61/974,808, filed on Apr. 3, 2014.

(51) Int. Cl.
*B29C 47/02* (2006.01)
*B29C 47/88* (2006.01)
(Continued)

(52) U.S. Cl.
CPC ........ *B29C 47/025* (2013.01); *B29C 47/0016* (2013.01); *B29C 47/0047* (2013.01); *B29C 47/1036* (2013.01); *B29C 47/8805* (2013.01); *B29C 47/8895* (2013.01); *B29C 47/90* (2013.01); *B29C 47/0019* (2013.01);
(Continued)

(58) Field of Classification Search
CPC ...... B29C 2793/009; B29C 2793/0027; B29C 47/0016; B29C 47/0047; B29C 47/025; B29C 47/0066; B29C 47/0019; B29C 47/1036; B29C 47/1045; B29C 47/8895;
(Continued)

(56) References Cited

U.S. PATENT DOCUMENTS 3,886,250 A * 5/1975 Danko ................. B29C 33/044
264/177.17
4,190,007 A * 2/1980 Kimura ................. D05B 21/00
112/470.07
(Continued)

OTHER PUBLICATIONS

14677565 Engineers Edge—Coefficients Linear Thermal Expansion, http://www.engineersedge.com/materials/coefficients_linear_thermal_expansion_13165.htm, (accessed Mar. 22, 2017).*

*Primary Examiner* — Matthew J Daniels
*Assistant Examiner* — Lawrence D. Hohenbrink, Jr.
(74) *Attorney, Agent, or Firm* — Warn Partners, P.C.

(57) ABSTRACT

An upstream/downstream process for making map pocket stiffeners formed of extruded material and a wire. The extrusion is drawn through a die of a main extruder forming a main body with a channel and the extrudate is then pulled through a first cooling tank to cool the extrudate and set the profile. The wire is automatically indexed into the channel by a programmable indexing device for proper location and distance between each piece of wire. The extrudate with the wire is re-heated and then pulled through a secondary extruder to encapsulate and seal the wire within the extruded material. The extrudate is cooled in a second cooling tank and passes through a series of rollers to achieve a predetermined shape before being cut and profiled to predetermined lengths and dimensions.

20 Claims, 4 Drawing Sheets

(51) Int. Cl.
*B29C 47/00* (2006.01)
*B29C 47/10* (2006.01)
*B29C 47/90* (2006.01)
*B29K 101/12* (2006.01)
*B29K 305/00* (2006.01)
*B29L 31/30* (2006.01)

(52) U.S. Cl.
CPC ........ *B29C 47/0066* (2013.01); *B29C 47/906* (2013.01); *B29C 2793/009* (2013.01); *B29C 2793/0027* (2013.01); *B29K 2101/12* (2013.01); *B29K 2305/00* (2013.01); *B29L 2031/3005* (2013.01)

(58) Field of Classification Search
CPC ... B29C 47/8805; B29C 47/906; B29C 47/90; B60R 7/04; B60R 7/043; B60R 7/081
USPC ................................ 264/149, 173.16, 211.14
See application file for complete search history.

(56) References Cited

U.S. PATENT DOCUMENTS

| | | | |
|---|---|---|---|
| 4,761,979 A * | 8/1988 | Kawaguchi | B21D 5/14 72/16.2 |
| 4,824,497 A * | 4/1989 | Tilman | A44B 19/40 156/244.15 |
| 5,212,349 A * | 5/1993 | Pelzer | B29C 31/002 174/68.3 |
| 2004/0200536 A1* | 10/2004 | Strasser | A62C 33/00 138/104 |
| 2006/0103045 A1* | 5/2006 | O'Brien-Bernini | B29C 47/0004 264/45.9 |
| 2012/0315003 A1* | 12/2012 | Mogensen | G02B 6/4459 385/100 |

* cited by examiner

METHOD FOR MAKING MAP POCKET STIFFENERS

CROSS-REFERENCE TO RELATED APPLICATIONS

This application claims the benefit of U.S. Provisional Application No. 61/974,808, filed Apr. 3, 2014.

FIELD OF THE INVENTION

The present invention relates to a method for making extruded stiffeners for attachment to motor vehicle components.

BACKGROUND OF THE INVENTION

Map pockets are generally known and are commonly used for motor vehicles and mobile living quarter vehicles. The final assembly map pockets are pockets located in a vehicle such as pockets in a sun visor and/or located in the back of driver and passenger seating or any other locations for selectively holding and storing items for the vehicle occupants. Generally, the map pockets are connected to or otherwise affixed on a vehicle component such as to the fabric/leather seating material creating a storage pocket. These map pockets are typically able to open wider by an occupant for access into the pocket when desired. Preferably, the map pocket stiffener is sewn to its mating part to form a final map pocket assembly.

Map pocket stiffeners are generally connected to the map pockets toward the opening of the pocket to keep the pocket more open to allow for easier access for the end user. Conventional map pocket stiffeners are made by an extrusion process and include a stiffening feature added thereto. However, the stiffening feature is not applied to the map pocket stiffener by insert extrusion. This results in an inferior map pocket stiffener and process for making the map pocket stiffener. Typical extrusion and processing steps have attempted unsuccessfully to overcompensate for various processing problems additionally causing further processing issues, further steps, complexity, perpetual adjustments, e.g., equipment speed adjustment, and additional costs.

Therefore, it is desirable to have a method for making map pocket stiffeners that helps to avoid or overcome processing issues, provide insert extrusion of a wire, and to improve the quality without adversely affecting or compromising the map pocket stiffener products.

SUMMARY OF THE INVENTION

The present invention is generally directed to a method for making map pocket stiffeners usable for attachment to final map pocket assemblies for in vehicle installation. Typically at least one of each of the following is provided: a main extruder, secondary extruder, wire with predetermined characteristics, indexing device, first cooling tank, second cooling tank, heating device, roller device, puller device, fabrication device, and router/planer device. The method includes insert extrusion where the wire is automatically indexed into a channel of an extrudate using a programmable indexing device to help ensure proper location and distance between each piece of wire. This is a significant advantage over conventional methods. After the wire is indexed into the channel the extrudate is re-heated prior to passing through the secondary extruder to seal the wire within the extruded material. Thereafter, the extrudate is cooled and passes through a series of rollers to achieve a predetermined shape, e.g., bowed, and cut to predetermined length and dimensions operable for selective installation into the final map pocket assembly. Preferably, the method is performed with in-line processing steps, upstream to downstream, arranged generally along the longitudinal axis with pulled material moving in a forward direction toward the at least one in-line fabrication device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
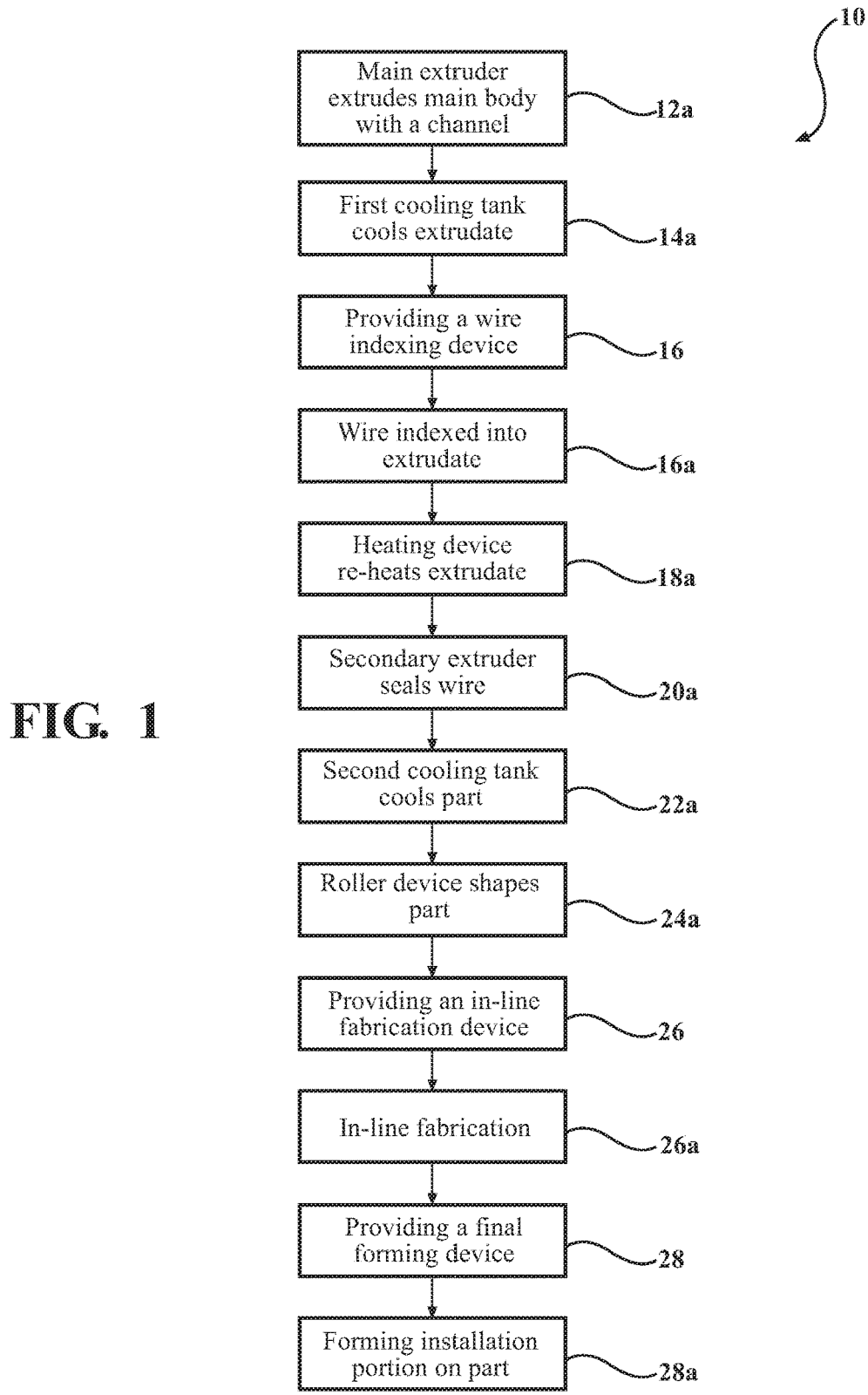
FIG. 1 is a flow chart illustrating exemplary steps in a manufacturing process for creating map pocket stiffeners, in accordance with the present invention.

The following description of the preferred embodiment(s) is merely exemplary in nature and is in no way intended to limit the invention, its application, or uses.

Referring to the figures generally, in accordance with the present invention there is provided a method for making map pocket stiffeners indicated generally at 10. At least one extruded material is provided for forming the map pocket stiffener with a wire insert 36 in an upstream/downstream extrusion processing configuration. Depending on the application the extruded materials are generally polypropylene (PP), medium density polyethylene (MDPE), or other material suitable for making the map pocket stiffener incorporating a wire. If more than one extruded material is used the extruded materials are compatible materials to melt bond to one another under pressure. The wire 36 is generally a spring wire, e.g., steel spring wire, typically, is a SWOSC-V wire, most preferably, is an ATSM A 401 spring wire, or any suitable wire depending on the application.

The method 10 includes providing a predetermined extrusion path comprised generally of at least one of each of a main extruder shown generally at 12, first cooling tank shown generally at 14, wire indexing device 16, heating device shown generally at 18, secondary extruder shown generally at 20, second cooling tank shown generally at 22, roller device shown generally at 24, puller device, and in-line fabrication device 26. Most preferably, the method is generally performed with in-line processing steps. The method further includes providing a final forming device 28, e.g., router/planer tool that is typically offline, for forming installation portion(s) on the map pocket stiffener such as at least one thinner sewing portion.

Figure 3:
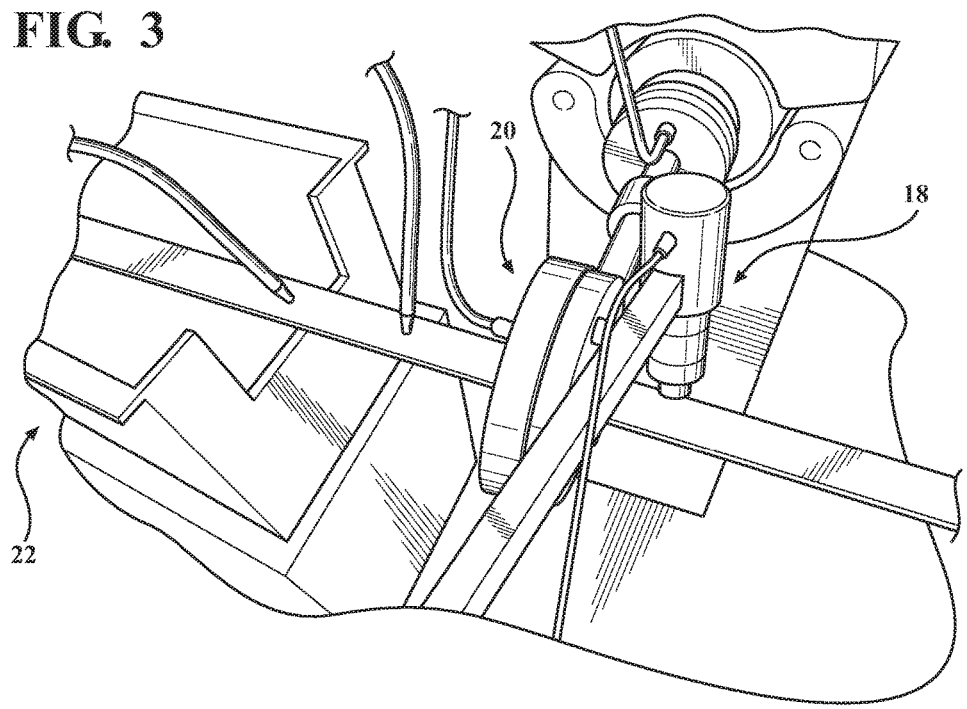
FIG. 3 is a rear perspective view of a heat gun device re-heating the extrudate with a wire in the channel, in accordance with the process of the present invention.
Figure 4:
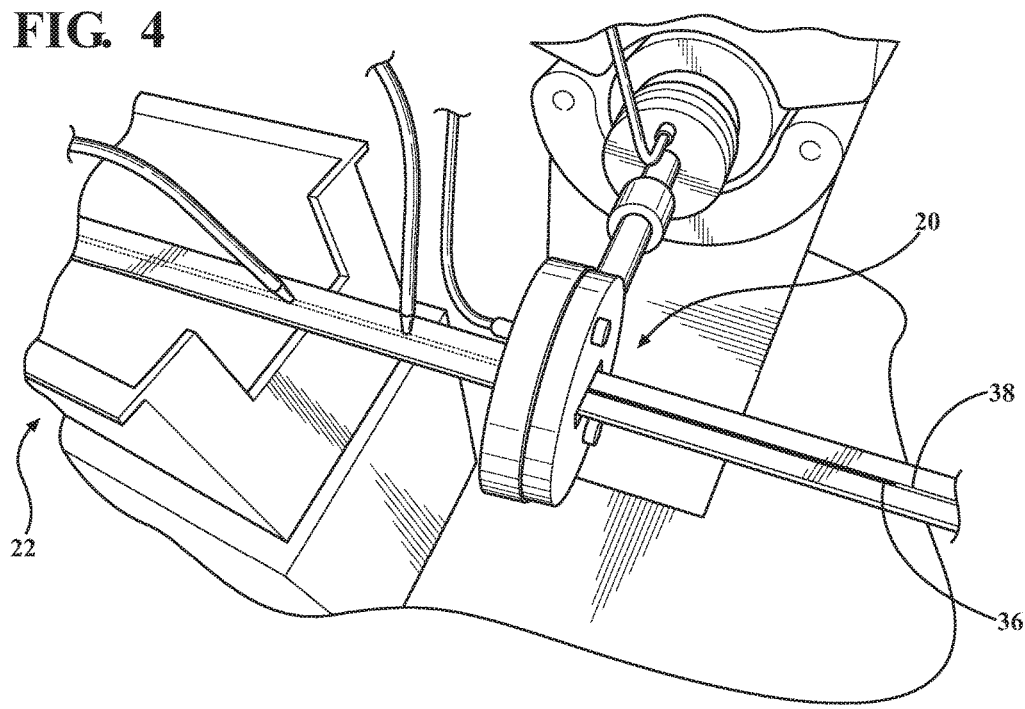
FIG. 4 is a rear perspective view of a secondary extruder for encapsulating and sealing the wire within the extrusion, in accordance with the process of the present invention.

The material to be extruded is first heated to a predetermined temperature. Generally, heated to about 315 to 420° F., typically, to about 385 to not more than 410° F., preferably, the material is heated to about 400° F. The material is then extruded at the main extruder 12 at step 12*a* forming the extrudate 30 that will be cut and shaped at later steps into the main body of the map pocket stiffener. Forcing the material through a predetermined shaped opening of the main extruder 12 shapes the material into a continuous form known as "extrudate". The extrudate 30/main body is extruded with a channel-in-part, channel 38 (see FIG. 4), operably configured and sized to accept insertion of the wire 36 (FIG. 4). The channel 38 is preferably centrally located along the length of the extrudate 30/main body (see FIG. 4). FIG. 4 illustrates the channel of the extrudate of FIGS. 2-3 omitted for clarity and the wire of the extrudate of FIG. 3 omitted for clarity.

After exiting the main extruder 12 the extrudate 30 is still heated and must be cooled at step 14*a* a desirable amount to avoid deformation. The extrudate 30 is moved, most preferably, by a pulling device located downstream, through the first cooling tank 14 having a controlled predetermined temperature range that both cools and shapes the extrudate 30 to achieve the desired predetermined temperature and dimensions for the main body to meet the proper size and reduce susceptible to deformation. Generally, the temperature of the cooling medium, most preferably water, in the first cooling tank 14 is about 40° F. The main body is typically cool to the touch after being cooled. Preferably, cooled to about room temperature to set the profile of the main body.

Figure 2:
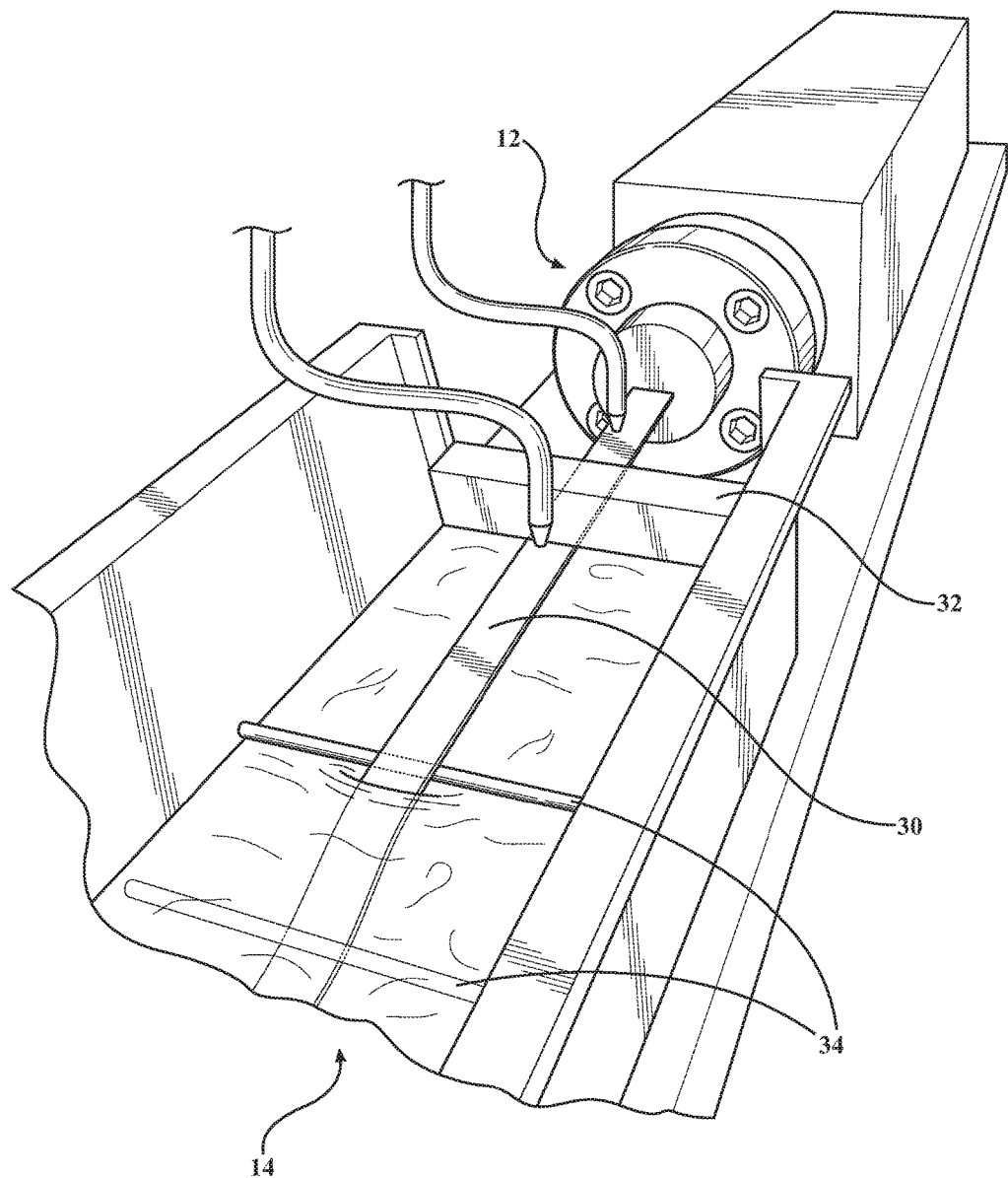
FIG. 2 is a perspective view of a main extruder and a first cooling tank having an extrudate with a channel pulled through the cooling tank from the main extruder, in accordance with the process of the present invention.

An exemplary arrangement of cross members is illustrated in FIG. 2 for guiding the extrudate 30 through the medium in first cooling tank 14. A first cross member 32 is illustrated adjacent to the main extruder 12 transverse to the direction of extrudate 30 travel immersing the extrudate 30 below the medium surface. A first of a pair of second cross members 34 transverse to the direction of extrudate 30 travel guides the extrudate 30 generally across the surface of the medium and over the cross member 34, while the second of the pair of second cross members 34 guides the extrudate 30 below the second of the pair of second cross members 34 further into the medium. Alternative arrangements are considered without deviating from the scope of the present invention. Optionally, the second cooling tank 22 is provided with at least one such cross member.

The wire 36 is automatically indexed into the channel 38 by an operable indexing device 16, at step 16*a*, that is programmable to ensure the proper predetermined location and distance between each piece of wire. Insert extrusion of the wire is beneficial and just one of the advantages in the method for forming the map pocket stiffener, especially insert extrusion as a step part way into the overall method for forming the map pocket stiffener. The length of the wire, location and distance between each piece of wire is variable depending on the application.

The indexing device 16 correlates indexing the wire 36 with the downstream movement of the main body/extrudate 30. The speed that the main body travels and the wire indexing, e.g., sensed and automatically correlated speed adjustments by a control unit and/or manually imputed speed based on line capacity and desired production volume, is additionally variable depending on the application without departing from the scope of the invention. Preferably, the programmable indexing device 16 is operably adjustable for correlating wire indexing with the speed of the main body/extrudate 30 and/or vice versa. It is further contemplated that the indexing device 16 is provided with a cutting device to additionally cut a continuous length of the wire in-line to the predetermined length for insertion into the channel 38.

Since the extrudate 30 was previously cooled, after the wire 36 is inserted and moved further downstream, the main body/extrudate 30 is re-heated with the heating device 18 (See FIG. 3) at step 18*a* to ensure a good bond between the wire 36 and the encapsulating extruded material. Typically, a heat gun is used to re-heat the extrudate 30 before the extrudate 30 enters the secondary extruder 20. Preferably, the heating device 18 is located over the top surface of the main body and heats at least the wire and the top surface of the extrudate 30 before the extrudate 30 is pulled through the secondary extruder 20. Re-heating increases the extrudate 30 temperature generally by about 10 to 350° F., typically, 75 to 300° F., preferably by at least about 100° F.

The extrudate 30 with the wire continues to be pulled downstream and through a predetermined shaped opening of the secondary extruder 20 where it is encapsulated by predetermined material extruded by the secondary extruder 20 to seal the wire 36 within the polymer, at step 20*a*. Generally, the extruded material is about 400° F. Preferably, the extruded material of the secondary extruder 20 is the same extruded material as the main extruder 12. Alternative compatible materials are contemplated without deviating from the scope of the invention.

After exiting the secondary extruder 20 the main body is pulled downstream through the second cooling tank 22. The second cooling tank 22 has a controlled predetermined temperature range and both cools and shapes the main body to achieve the desired predetermined temperature and dimensions and reduce susceptible to deformation, at step 22*a*. Generally, the temperature of the cooling medium, preferably water, in the second cooling tank 22 is about 40° F. The main body is cool to the touch after being cooled. Preferably, cooled to about room temperature to set the profile of the main body.

Figure 5:
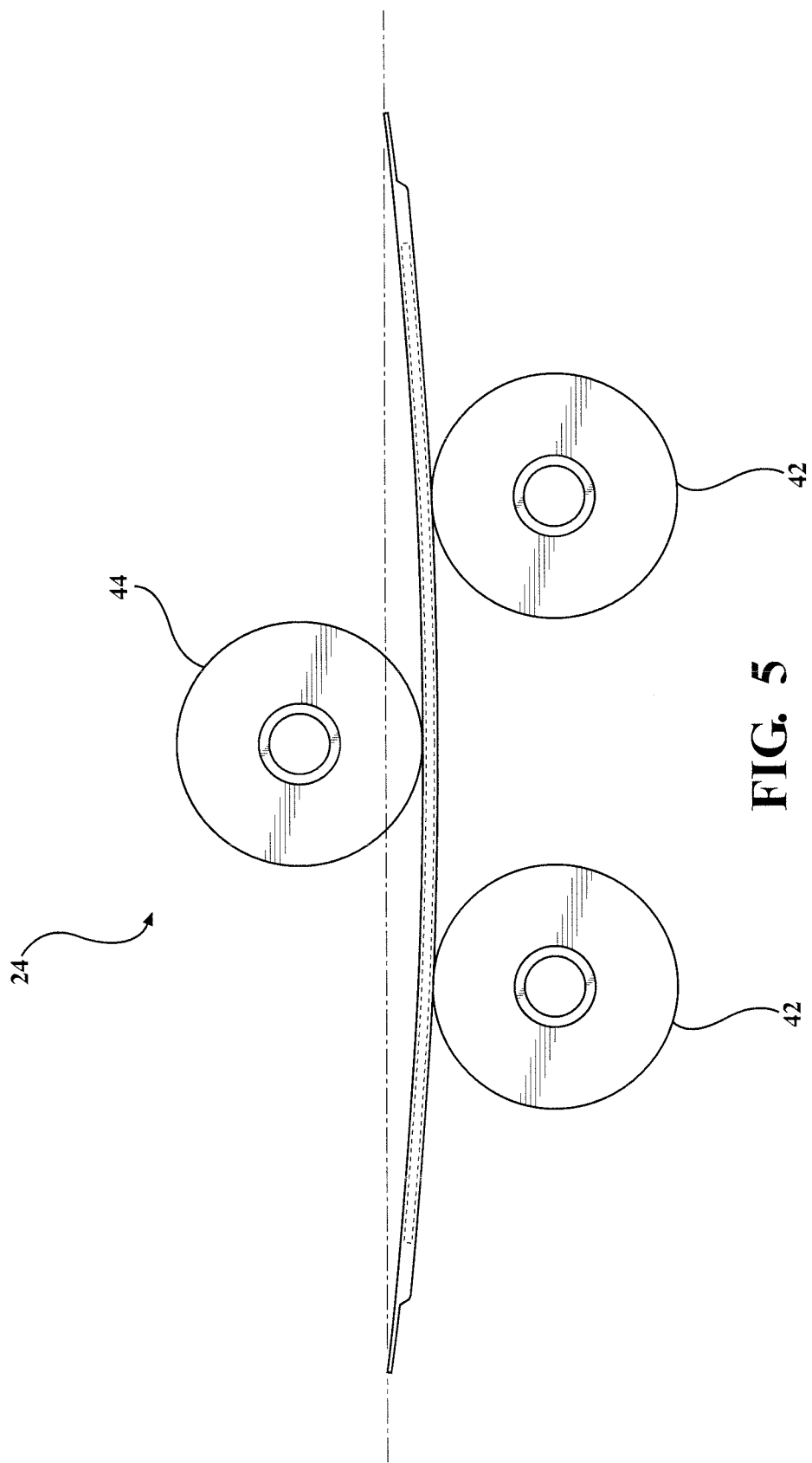
FIG. 5 is a front elevation view of a roller device arrangement for further forming the map pocket stiffener, in accordance with the process of the present invention.

After the main part has been cooled a desired amount it continues to move downstream into the roller device 24 including a series of rollers arranged and configured to achieve a desired shape at step 24*a*, preferably, a bowed shape. By way of example a bow shape (R-1540.0 mm). Preferably, at least three rollers are used. FIG. 5 depicts a pair of bottom rollers 42 that are spaced apart along a plane and a top roller 44 above the plane and between the pair of rollers 42. At least the top roller 44 is adjustable, e.g., longitudinally and/or vertically adjustable relative to the pair of rollers 42. When the main body is pulled through the roller device 24 between the top roller 44 and the pair of bottom rollers 42, the roller arrangement forces the main body to curve to achieve the desired predetermined bow shape. It is contemplated that, alternatively, the main body is previously cut to length.

The main body 30 moves downstream into the in-line fabrication device 26 where, at step 26*a*, the main body is cut to length and the desired radii on each end of the main body 30 is established. The in-line fabrication device 26 is operably configured to cut the main body to the predetermined length and form the desired predetermined radii on each end of the main body. It is contemplated that the in-line fabrication device 26 is located upstream from the series of rollers of the rolling device 24. Preferably, the in-line fabrication device 26 is located downstream from the series of rollers.

In a preferred embodiment the method is performed with in-line processing steps with pulled material moving in a forward or downstream direction toward the in-line fabrication device 26. At least one puller is used to pull the main body downstream, e.g., from the main extruder 12 and downstream through at least the second cooling tank 22. Alternatively, from the main extruder 12 and downstream through at least the roller device 24. It is contemplated that the at least one puller can, alternatively, be located downstream of the in-line fabrication device 26 for additionally pulling the main body through the in-line fabrication device 26. It is further contemplated that at least two pullers are used along the upstream/downstream path to pull material downstream. Preferably, only one pulling device is used.

The main body is then moved to the final forming device 28, e.g., router/planer tool that is typically offline, for forming installation portion(s) on the map pocket stiffener at step 28a such as at least one thinner sewing portion. The router/planer tool 28 is operably configured to remove material to create at least one thinner region on the part for installation into the final assembly. The router/planer tool 28 preferably cuts the thinner region toward each end to allow for easier installation. Each end of the main body is inserted into the router/planer tool that cuts the material to be thinner on each end to allow for easier installation of the map pocket stiffener into the final map pocket assembly. By way of example, the router/planer tool 28 cuts a thinner "sewing-line" on each end to help prevent a needle device from breaking when sewing the map pocket stiffener into the final map pocket assembly.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A method for making a map pocket stiffener, comprising:
   providing a main extruder and a secondary extruder;
   providing a first cooling tank and a second cooling tank;
   providing an indexing device that is programmable;
   providing wire;
   extruding a predetermined extruded material from the main extruder forming an extrudate with a channel;
   cooling the extrudate in a cooling medium located in the first cooling tank a predetermined amount;
   indexing the wire automatically into the channel with the indexing device to ensure a predetermined location and distance between adjacent wires;
   reheating the extrudate;
   extruding the same or a different extruded material from the secondary extruder onto the extrudate to encapsulate the wire in the channel;
   cooling the extrudate in a cooling medium located in the second cooling tank a predetermined amount; and
   shaping and cutting to a predetermined length to form the map pocket stiffener having predetermined dimensions, shape and profile.

2. The method for making a map pocket stiffener of claim 1, wherein the wire is a steel spring wire cut to a predetermined length.

3. The method for making a map pocket stiffener of claim 1, wherein the extruded material is polypropylene or medium density polyethylene.

4. The method for making a map pocket stiffener of claim 1, further comprising heating the extruded material to about 385 to 410° F. in the main extruder prior to extruding.

5. The method for making a map pocket stiffener of claim 1, wherein cooling the extrudate in the first cooling tank reduces the temperature of the extrudate to about 65 to 75° F.

6. The method for making a map pocket stiffener of claim 1, further comprising providing a heating device for re-heating the extrudate a predetermined amount operable to ensure bonding between the wire and the encapsulating extruded material from the secondary extruder.

7. The method for making a map pocket stiffener of claim 6, wherein the heating device is a heat gun and increases an extrudate bonding surface temperature by at least about 100° F.

8. The method for making a map pocket stiffener of claim 1, further comprising providing a roller device comprising a series of rollers, where after cooling in the second cooling tank the map pocket stiffener is pulled through the rolling device to operably bow the map pocket stiffener.

9. The method for making a map pocket stiffener of claim 8, wherein the roller device comprises a top roller and a pair of bottom rollers, where at least the top roller is adjustable to form the desired bow shape.

10. The method for making a map pocket stiffener of claim 1, further comprising providing an in-line fabrication device to cut the map pocket stiffener to a predetermined length.

11. The method for making a map pocket stiffener of claim 10, wherein the in-line fabrication device additionally forms the desired radii on each end of the map pocket stiffener.

12. The method for making a map pocket stiffener of claim 1, further comprising providing a router/planer tool that forms at least one thinner sewing line on the map pocket stiffener to provide installation attachment portion(s) for easier installation into a final assembly.

13. The method for making a map pocket stiffener of claim 1, further comprising providing a plurality of cross members in the first cooling tank and/or second cooling tank directing the extrudate through the cooling medium.

14. The method for making a map pocket stiffener of claim 1, wherein the method is an upstream/downstream extrusion process.

15. A method for making a map pocket stiffener for a vehicle, comprising:
   providing a predetermined extrusion material;
   providing a main extruder;
   providing a first cooling tank and a second cooling tank;
   providing an indexing device that is programmable;
   providing spring steel wire;
   providing a heating device;
   providing a secondary extruder for encapsulating the wire;
   providing a roller device to bow the map pocket stiffener;
   providing an in-line fabrication device to cut the map pocket stiffener to length;
   extruding the extrusion material to form an extrudate with a centrally located channel;
   moving the extrudate through the first cooling tank of water to cool and shape the extrudate;
   indexing the wire automatically into the channel using the indexing device to ensure a predetermined location and distance between each piece of wire;
   heating the extrudate with the heating device to a predetermined temperature;

extruding the same or a different extrusion material from the secondary extruder onto the extrudate to encapsulate the wire in the channel;
moving the extrudate through the second cooling tank of water to cool and shape the extrudate;
bowing the map pocket stiffener with the roller device; and
cutting the map pocket stiffener to predetermined length with the in-line fabrication device;
wherein the method is an upstream/downstream extrusion process.

16. The method for making a map pocket stiffener of claim 15, further comprising providing a final forming device offline and forming thinner installation portions.

17. The method for making a map pocket stiffener of claim 16, wherein the final forming device is a router/planer tool that cuts thinner sewing lines on each end of the map pocket stiffener to allow for easier installation into a final assembly.

18. The method for making a map pocket stiffener of claim 15, further comprising heating the extrusion material to about 385 to 410° F. in the main extruder prior to extruding.

19. The method for making a map pocket stiffener of claim 15, the indexing device correlates indexing the wire with the downstream movement of the extrudate.

20. A method for making map pocket stiffeners for motor vehicles, comprising:
providing at least one predetermined extrusion material;
providing spring steel wire;
providing a main extruder operable to heat the extrusion material to about 315 to 420° F. and shaping the extrusion material into an extrudate;
providing a controlled temperature first cooling tank with a plurality of cross members for guiding the extrudate through water, the first cooling tank cooling the extrudate to set the profile;
providing an indexing device that is operably programmable;
providing a heating device;
providing a secondary extruder for encapsulating the wire;
providing a second cooling tank adjacent to the secondary extruder to cool and shape the extrudate;
providing a roller device having a series of rollers to bow the map pocket stiffener;
providing an in-line fabrication device to cut the map pocket stiffener to length;
providing a router/planer device;
extruding the extrusion material to form an extrudate with a centrally located channel;
moving the extrudate through the first cooling tank of water to cool and shape the extrudate;
indexing the wire automatically into the channel using the indexing device to ensure a predetermined location and distance between each piece of wire, the indexing device correlating indexing the wire with the downstream movement of the extrudate;
re-heating the extrudate with the heating device to a predetermined temperature;
extruding the same or a different extrusion material from the secondary extruder onto the extrudate to encapsulate the wire in the channel;
moving the extrudate through the second cooling tank of water to cool and shape the extrudate;
bowing the map pocket stiffener with the roller device; and
cutting the map pocket stiffener to predetermined length with the in-line fabrication device;
cutting thinner installation portions on the map pocket stiffener with the router/planer device;
wherein the method is an upstream/downstream in-line extrusion process with the exception that the router/planer device is offline.

* * * * *